US010735245B2

(12) United States Patent
Ikeda

(10) Patent No.: US 10,735,245 B2
(45) Date of Patent: Aug. 4, 2020

(54) INFORMATION PROCESSING APPARATUS AND INFORMATION PROCESSING METHOD

(71) Applicant: CANON KABUSHIKI KAISHA, Tokyo (JP)

(72) Inventor: Atsushi Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 15/367,268

(22) Filed: Dec. 2, 2016

(65) Prior Publication Data

US 2017/0085416 A1  Mar. 23, 2017

Related U.S. Application Data

(63) Continuation of application No. PCT/JP2015/002226, filed on Apr. 24, 2015.

(30) Foreign Application Priority Data

Jul. 4, 2014  (JP) ................. 2014-139160

(51) Int. Cl.
*H04L 12/24* (2006.01)
*G06F 13/00* (2006.01)
(Continued)

(52) U.S. Cl.
CPC ............ *H04L 41/06* (2013.01); *G06F 13/00* (2013.01); *H04L 41/0645* (2013.01);
(Continued)

(58) Field of Classification Search
CPC ..... H04L 41/06; H04L 41/0668; H04L 43/08; H04L 43/0823; H04L 67/02; H04L 67/14; H04L 69/18; H04L 69/40
See application file for complete search history.

(56) References Cited

U.S. PATENT DOCUMENTS 5,720,014 A     2/1998  Ikeda et al. ............... 395/114
5,835,724 A  *  11/1998 Smith ..................... H04L 67/14
                                                          709/227

(Continued)

FOREIGN PATENT DOCUMENTS

CN      101393556        3/2009
JP      2007-265356     10/2007
(Continued)

OTHER PUBLICATIONS

Yap, Ken, "A Technical Overview of the New HTTP/1.1 Specification", https://web.archive.org/web/20021105161855/https://www.gpstudio.com/tutorials/protocols/http11/overview.html, 2002, Entire Document. (Year: 2002).*

(Continued)

*Primary Examiner* — Nam T Tran
(74) *Attorney, Agent, or Firm* — Venable LLP

(57) ABSTRACT

Data communication with one or more servers is performed based on a plurality of sessions using the first communication protocol. Error detection is performed in at least one session out of the plurality of sessions. When an error is detected in the first session out of the plurality of sessions, a communication protocol used for data communication in the second session out of the plurality of sessions using the first communication protocol is changed from the first communication protocol to the second communication protocol.

15 Claims, 12 Drawing Sheets

(51) Int. Cl.
  *H04L 29/06* (2006.01)
  *H04L 12/26* (2006.01)
  *H04L 29/08* (2006.01)
(52) U.S. Cl.
  CPC .......... *H04L 41/0681* (2013.01); *H04L 43/08* (2013.01); *H04L 67/02* (2013.01); *H04L 67/14* (2013.01); *H04L 69/18* (2013.01); *H04L 41/0253* (2013.01)

(56) References Cited

U.S. PATENT DOCUMENTS

| | | | |
|---|---|---|---|
| 5,905,582 A | 5/1999 | Hirai et al. | 358/468 |
| 6,049,597 A | 4/2000 | Satake et al. | 379/93.08 |
| 6,134,680 A * | 10/2000 | Yeomans | H04L 69/40 |
| | | | 709/219 |
| 6,266,162 B1 | 7/2001 | Okamura et al. | 358/468 |
| 6,442,252 B1 | 8/2002 | Fujise et al. | 379/100.01 |
| 6,557,963 B1 | 5/2003 | Ikeda | 347/14 |
| 9,311,306 B2 | 4/2016 | Tamura | G06F 17/30011 |
| 2002/0099844 A1* | 7/2002 | Baumann | H04L 47/10 |
| | | | 709/232 |
| 2004/0019636 A1* | 1/2004 | St. Pierre | H04L 29/12113 |
| | | | 709/203 |
| 2009/0083286 A1 | 3/2009 | Tamura | 707/10 |
| 2009/0240766 A1* | 9/2009 | Kikkawa | H04L 67/02 |
| | | | 709/203 |
| 2013/0061159 A1* | 3/2013 | Tseng | G06F 17/30873 |
| | | | 715/760 |
| 2015/0127841 A1 | 5/2015 | Kitamura | 709/228 |

FOREIGN PATENT DOCUMENTS

| | | |
|---|---|---|
| JP | 2009-075850 | 4/2009 |
| JP | 2012-073744 | 4/2012 |
| WO | WO2014/002337 | 1/2014 |

OTHER PUBLICATIONS

Belshe et al., Hyper text Transfer Protocol version 2.0 draft-ietf-httpbis-http2-07, Internet-Draft, Oct. 21, 2013, pp. 1-62.
Peon & Ruellan, HPACK—Header Compression for HTTP/2.0 draft-ietf-httpb is-header-compression-03, Internet-Draft, Aug. 27, 2013, pp. 1-23.

* cited by examiner

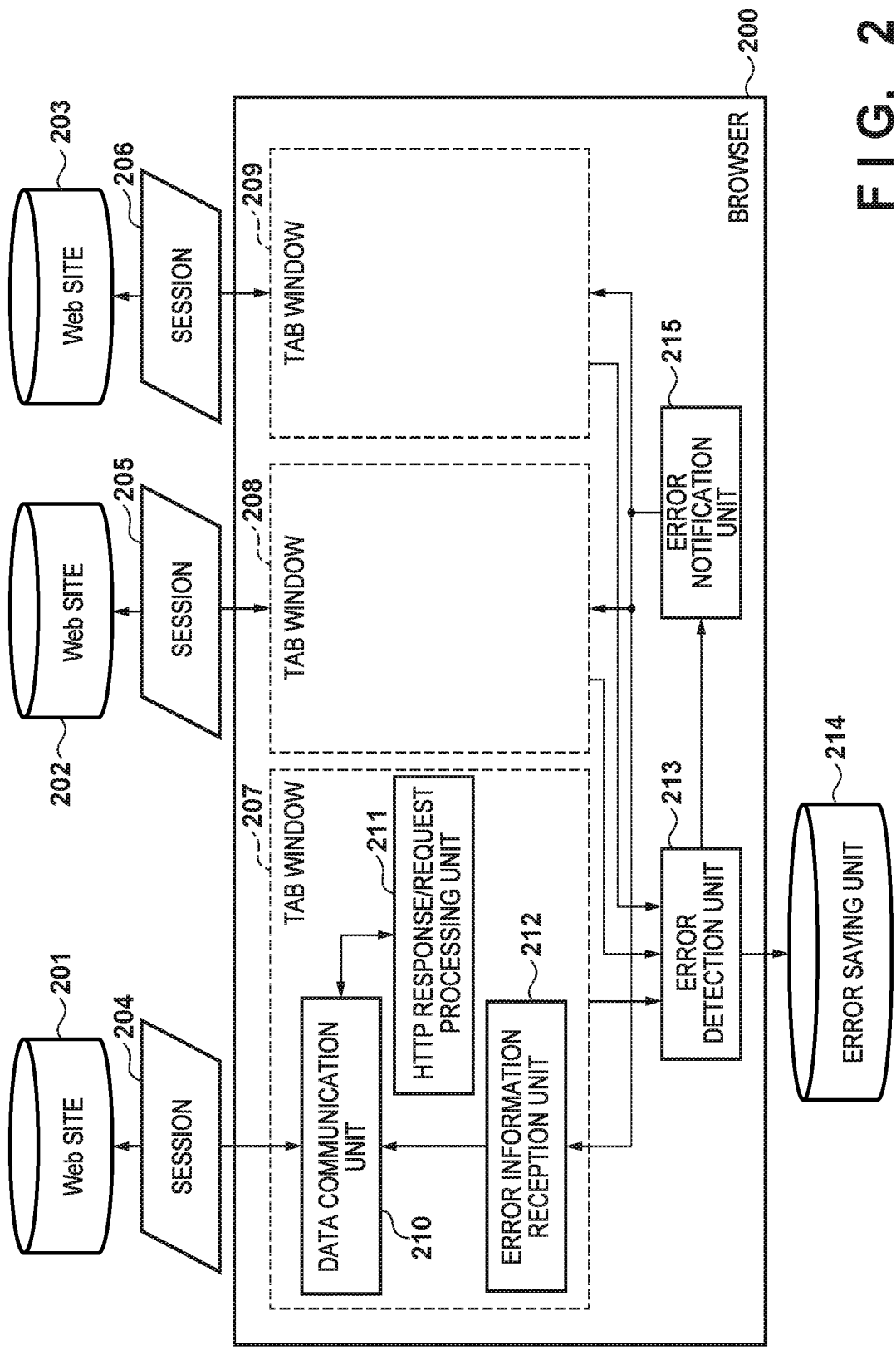

F I G. 7

| NAME | VALUE | CONTENTS | PROCESS AFTER RECEIVING ERROR INFORMATION |
|---|---|---|---|
| NO_ERROR | 0 | NO ERROR | 1 |
| PROTOCOL_ERROR | 1 | ENDPOINT DETECTS UNSPECIFIC ERROR (THIS ERROR IS USED WHEN SPECIFIC ERROR CODE IS NOT PROVIDED) | 3 |
| INTERNAL_ERROR | 2 | UNEXPECTED INTERNAL ERROR OCCURS AT ENDPOINT | 2 |
| FLOW_CONTROL_ERROR | 3 | ENDPOINT DETECTS FLOW CONTROL PROTOCOL VIOLATION AT CONNECTION DESTINATION | 3 |
| SETTINGS_TIMEOUT | 4 | SETTINGS FRAME TRANSMITTED BY ENDPOINT IS NOT PROCESSED WITHIN SUITABLE TIME | 3 |
| STREAM_CLOSED | 5 | ENDPOINT RECEIVES FRAME FROM HALF-DISCONNECTED STREAM | 2 |
| FRAME_SIZE_ERROR | 6 | ENDPOINT RECEIVES FRAME LARGER THAN CORRESPONDING MAXIMUM SIZE | 2 |
| REFUSED_STREAM | 7 | ENDPOINT REJECTS STREAM BEFORE PERFORMING APPLICATION PROCESSING | 2 |
| CANCEL | 8 | ENDPOINT USES TO INDICATE THAT STREAM BECOMES UNNECESSARY | 2 |
| COMPRESSION_ERROR | 9 | ENDPOINT FAILS TO MAINTAIN COMPRESSED CONTEXT FOR CONNECTION | 3 |
| CONNECT_ERROR | 10 | CONNECTION IS RESET OR ABENDED | 4 |
| ENHANCE_YOUR_CALM | 11 | CONNECTION DESTINATION OPERATES FOR PREDETERMINED TIME OR LONGER | 4 |
| INADEQUATE_SEQURITY | 12 | SECURITY PROBLEM ARISES | 4 |
| HTTP_1_1_REQUIRED | 13 | COMMUNICATION PROTOCOL CHANGE REQUEST(HTTP/2 → HTTP/1.1) IS RECEIVED | 3 |

INFORMATION PROCESSING APPARATUS AND INFORMATION PROCESSING METHOD

CROSS-REFERENCE TO RELATED APPLICATIONS

This application is a Continuation of International Patent Application No. PCT/JP2015/002226, filed Apr. 24, 2015, which claims the benefit of Japanese Patent Application No. 2014-139160, filed Jul. 4, 2014, both of which are hereby incorporated by reference herein in their entirety.

BACKGROUND OF THE INVENTION

Field of the Invention

The present invention relates to information processing for browsing information on a Web site.

Background Art

In general, a client apparatus needs to perform data communication with a server apparatus which saves data on a Web site in order to display a page of the Web site on a screen of the client apparatus. A communication protocol called HTTP (hypertext transfer protocol) which is developed by the IETF® (The Internet Engineering Task Force) is used for the data communication. The version of HTTP generally used is 1.1 and is denoted as HTTP/1.1. HTTP/1.1 is a widespread communication protocol.

Recently, the data amount of a content contained on a Web site increases dramatically, and many Web sites contain animation and interactions. Consequently, a mechanism for communicating data at a high speed is required of HTTP. Therefore, the IETF® starts to develop HTTP/2 serving as the next-generation version of HTTP (see NPL 1). HTTP/2 has a function of compressing a header when transmitting/receiving the header between a client apparatus and a server apparatus (see NPL 2), and a function of communicating data by giving it priority. It is therefore expected that a communication speed improves.

When utilizing HTTP/2, the client apparatus first inquires of the server apparatus whether HTTP/2 is available. If it is found that HTTP/2 is available as a result of the inquiry, HTTP/2 starts communication. On the other hand, if it is found that HTTP/2 is unavailable, HTTP/1.1 starts communication. Note that communication by HTTP/2 is not necessary, and the client apparatus may start communication by HTTP/1.1 without making the inquiry.

CITATION LIST

Non Patent Literature

NPL 1: www.ietf.org/id/draft-ietf-httpbis-http2-07.txt
NPL 2: www.ietf.org/id/draft-ietf-httpbis-header-compression-03.txt At present, a user can browse a plurality of Web sites at the same time regardless of a personal computer (PC) environment or a mobile environment. At this time, a client apparatus establishes a plurality of sessions and accesses a different Web site for each session.

However, when the server apparatus implements incorrect HTTP/2, the Web sites cannot be browsed correctly. In general, the same protocol implementation is utilized in the same domain. Therefore, if a server apparatus in a certain domain implements incorrect HTTP/2, all sessions which access a Web site in that domain cannot obtain correct data on the Web site. Further, even if they obtain the correct data at a certain time, it is predicted that they cannot obtain the correct data eventually.

When accessing the Web site again where the correct data cannot be obtained, the client apparatus which is notified by the server apparatus that HTTP/2 is available even though the protocol implementation is not correct starts communication by HTTP/2. Again, it is therefore impossible to process HTTP/2 correctly and browse the Web sites correctly.

Thus, a mechanism for sharing error information in HTTP/2 among a plurality of sessions or a mechanism for saving the error information is required of the client apparatus.

An object of the present invention is to provide the mechanism for sharing the error information among the plurality of sessions.

SUMMARY OF THE INVENTION

The present invention includes the following arrangement as one means for achieving the aforementioned object.

According to an aspect of the present invention, there is provided an information processing apparatus comprising: a communication unit configured to perform data communication with not less than one server based on a plurality of sessions using a first communication protocol; a detection unit configured to perform error detection in at least one session out of the plurality of sessions; and a protocol control unit configured to change a communication protocol used for data communication in a second session out of the plurality of sessions using the first communication protocol from the first communication protocol to a second communication protocol when the detection unit detects an error in a first session out of the plurality of sessions.

According to another aspect of the present invention, there is provided an information processing apparatus comprising: a communication unit configured to obtain content data for being displayed in a Web browser having a plurality of tabs from not less than one server by using a first communication protocol; a detection unit configured to perform error detection in communication corresponding to at least one tab out of the plurality of tabs; and a protocol control unit configured to change a communication protocol used for communication corresponding to a second tab out of the plurality of tabs which obtains content data by using the first communication protocol from the first communication protocol to a second communication protocol when the detection unit detects an error in communication corresponding to a first tab out of the plurality of tabs.

According to an aspect of the present invention, there is provided an information processing method comprising: performing data communication with not less than one server based on a plurality of sessions using a first communication protocol; performing error detection in at least one session out of the plurality of sessions; and changing a communication protocol used for data communication in a second session out of the plurality of sessions using the first communication protocol from the first communication protocol to a second communication protocol when an error in a first session out of the plurality of sessions is detected in the error detection.

According to another aspect of the present invention, there is provided an information processing method comprising: obtaining content data for being displayed in a Web browser having a plurality of tabs from not less than one server by using a first communication protocol; performing error detection in communication corresponding to at least one tab out of the plurality of tabs; and changing a communication protocol used for communication corresponding to a second tab out of the plurality of tabs which obtains content data by using the first communication protocol from the first communication protocol to the second communication protocol when an error in communication corresponding to a first tab out of the plurality of tabs is detected in the error detection.

Further features of the present invention will become apparent from the following description of exemplary embodiments with reference to the attached drawings.

BRIEF DESCRIPTION OF THE DRAWINGS

The accompanying drawings are included in a specification, constitute a part thereof, show embodiments of the present invention, and are used to describe the principle of the present invention together with a description thereof.

FIG. 2 is a block diagram for explaining the processing arrangement of a browser when browsing a plurality of Web pages;

FIG. 7 is a table for explaining a processing relationship when error information and errors defined by HTTP/2 are received;

DESCRIPTION OF THE EMBODIMENTS

An information processing apparatus and an information processing method according to embodiments of the present invention will be described in detail below with reference to the drawings. Note that embodiments do not limit the present invention related to the scope of the claims, and all of combinations of arrangements described in the embodiments are not indispensable for solution of the present invention.

First Embodiment

Error processing when a plurality of Web pages are browsed at the same time by a Web browser (to be referred to as a "browser" hereinafter) of a client apparatus will be described as the first embodiment. That is, an example will be described in which error information of HTTP/2 is shared in all sessions, the sessions are terminated when an error occurs, and HTTP/1.1 attempts to resume the sessions. The present invention realizes an improvement in a mechanism of the client apparatus in communication between a server apparatus and the client apparatus. A process of downloading data from the server apparatus will be described in the first embodiment.

[Arrangement of Apparatus]

Figure 1:
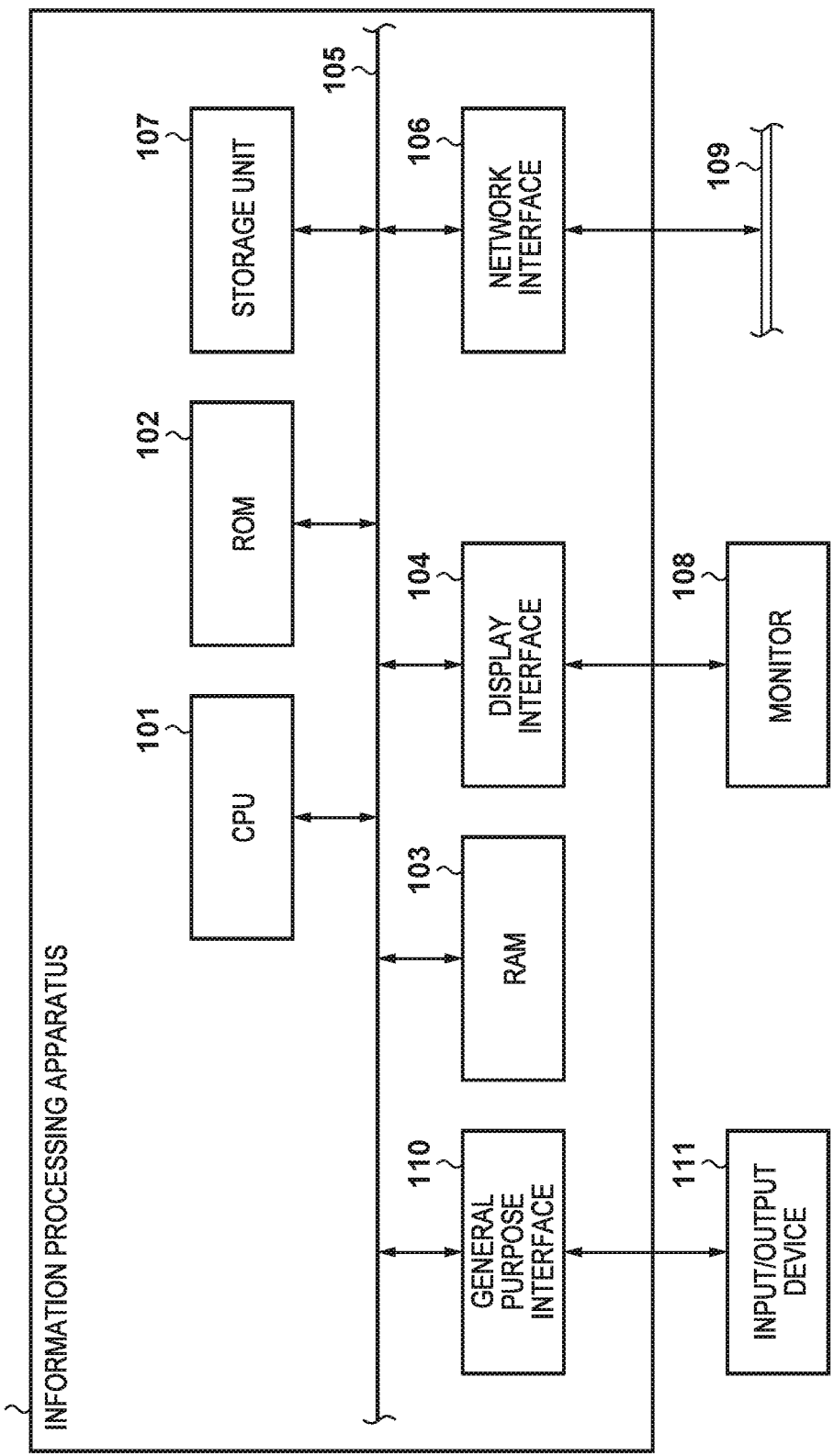
FIG. 1 is a block diagram for explaining an example of the arrangement of an information processing apparatus serving as a client apparatus according to an embodiment.

The arrangement of an information processing apparatus 100 serving as the client apparatus according to the embodiment will be described with reference to a block diagram shown in FIG. 1. A microprocessor (CPU) 101 executes an operating system (OS) and various programs stored in a read only memory (ROM1) 02 and a storage unit 107 using a random access memory (RAM) 103 as a work memory, thereby controlling the entire information processing apparatus 100 via a system bus 105.

The ROM 102 is a non-volatile memory which stores programs and parameters not requiring changes. The RAM 103 is a volatile memory which temporarily stores externally supplied programs and data, data generated midway through a process of the CPU 101, and the like. The storage unit 107 is a storage medium such as a hard disk drive (HDD) or a solid-state drive (SSD) and stores the OS, software of various drivers, application programs of the browser and the like, and various data.

A display interface 104 displays various kinds of information on a monitor 108 in accordance with control of the CPU 101. A network interface 106 performs communication via a wired or wireless network 109 in accordance with control of the CPU 101. A general-purpose interface 110 is an interface such as a USB (Universal Serial Bus), and can be connected to an input device such as a mouse or a keyboard for inputting a user instruction, or various input/output devices 111 including a memory card reader/writer and the like.

The information processing apparatus 100 is a personal computer (PC), or a portable device such as a cellular phone, a smartphone, or a tablet device. In the case of the portable device, the monitor 108 having a touch panel function may be incorporated into the information processing apparatus 100.

[Processing of Browser]

The processing arrangement of a browser 200 when browsing the plurality of Web pages will be described with reference to a block diagram shown in FIG. 2. Note that the CPU 101 activates the browser 200 in accordance with a user instruction. In accordance with a user instruction, the browser 200 accesses three Web sites in an example shown in FIG. 2, obtains content data on the Web pages from the server apparatus which provides each Web site, and displays the Web pages in the respective tab windows.

In FIG. 2, the browser 200 accesses Web sites 201 to 203, starts sessions 204 to 206 with the respective Web sites, and displays the Web pages in tab windows 207 to 209. The browser 200 has the arrangements below corresponding to the respective tab windows. Note that the arrangements corresponding to the respective tab windows are the same, and thus only the arrangement corresponding to the tab window 207 will be described.

Note that in accordance with access from the browser 200 to the server apparatus which provides the Web sites, each session is managed by a session ID issued from the server apparatus.

A data communication unit 210 uses an HTTP protocol to perform communication of data including a header and a payload with the server apparatus of the Web site 201 via the session 204. An HTTP response/request processing unit 211 is a data processing unit which processes data input from the data communication unit 210 as response data, generates request data in accordance with a processing result, and outputs the generated request data to the data communication unit 210. An error information reception unit 212 receives error information to be described later.

The browser 200 also has the following arrangement independent of the tab windows. An error detection unit 213 detects an error that has occurred in the data communication unit 210 or the HTTP response/request processing unit 211 and stores the error information indicating the detected error in an error saving unit 214 assigned to the RAM 103 or the storage unit 107. If the error detection unit 213 detects the error, an error notification unit 215 outputs the error information indicating the error to the error information reception unit 212 corresponding to each tab window.

The error detection unit 213 and the error notification unit 215 may not be initial constituent elements of the browser 200, but may be created as so-called add-ons that can be embedded into the browser 200 later and may be embedded into the browser 200 via a recording medium a network.

The processing of the browser 200 will be described with reference to flowcharts shown in FIGS. 3A and 3B. Note that a description will be made assuming that the browser 200 starts, for example, a process corresponding to the tab window 207. The browser 200 determines whether the error saving unit 214 stores the error information (step S301). If the error information is stored, the browser 200 performs protocol control of changing a communication protocol of the data communication unit 210 from HTTP/2 to HTTP/1.1 (step S302).

Then, the browser 200 starts the session 204 by the data communication unit 210 and transmits request data to the server apparatus of the Web site 201 (step S303). At this time, the browser 200 launches one new process on the client apparatus, establishes a new session on that process, and starts the session. Similarly, a new process is also launched when a new session corresponding to each of the tab windows 208 and 209 is established and started.

Then, the browser 200 determines whether to terminate the session 204 (step S304). If terminating the session 204, the browser 200 terminates the session 204 by the data communication unit 210 (step S315) and terminates the process corresponding to the tab window 207 (terminates the corresponding process). On the other hand, if not terminating the session 204, the browser 200 determines whether the error information reception unit 212 receives the error information (step S305).

If it is determined that the error information is not received, the browser 200 transmits/receives data to/from the server apparatus of the Web site 201 by the data communication unit 210 (step S306). Then, the HTTP response/request processing unit 211 processes the received data as response data of HTTP and generates request data of HTTP in accordance with a processing result (step S307).

While transmitting/receiving the data and processing the response data, the error detection unit 213 monitors occurrence of an error (step S308). If no error occurs, the browser 200 returns the process to step S304 and continues the process. On the other hand, if the error occurs, the error notification unit 215 notifies the error information reception units 212 corresponding to all the sessions of the error information (step S309), and the error detection unit 213 stores the error information in the error saving unit 214 (step S310).

For example, if an error occurs during HTTP response processing of the tab window 207 while the tab windows 207 to 209 are open, the error notification unit 215 notifies the error information reception units 212 corresponding to all the sessions of error information. A notification method of the error information utilizes, for example, a mechanism for interprocess communication depending on implementation of the client apparatus. When the client apparatus is implemented by, for example, the C language, interprocess communication can be implemented by using a pipe ( ) function or a socket ( ) function.

If the browser 200 determines in step S305 that the error information is received, or the error information is stored in step S310, the browser 200 determines whether the communication protocol has already been changed to HTTP/1.1 (step S311). If the communication protocol has already been changed, the browser 200 terminates the session 204 by the data communication unit 210 (step S315) and terminates the process corresponding to the tab window 207. On the other hand, if the communication protocol has not been changed yet, the browser 200 terminates the session 204 by the data communication unit 210 (step S312). Then, the browser 200 performs protocol control of changing the communication protocol of the data communication unit 210 from HTTP/2 to HTTP/1.1 (step S313), resumes the session 204 by the data communication unit 210 (step S314), and returns the process to step S304.

Figure 3A:
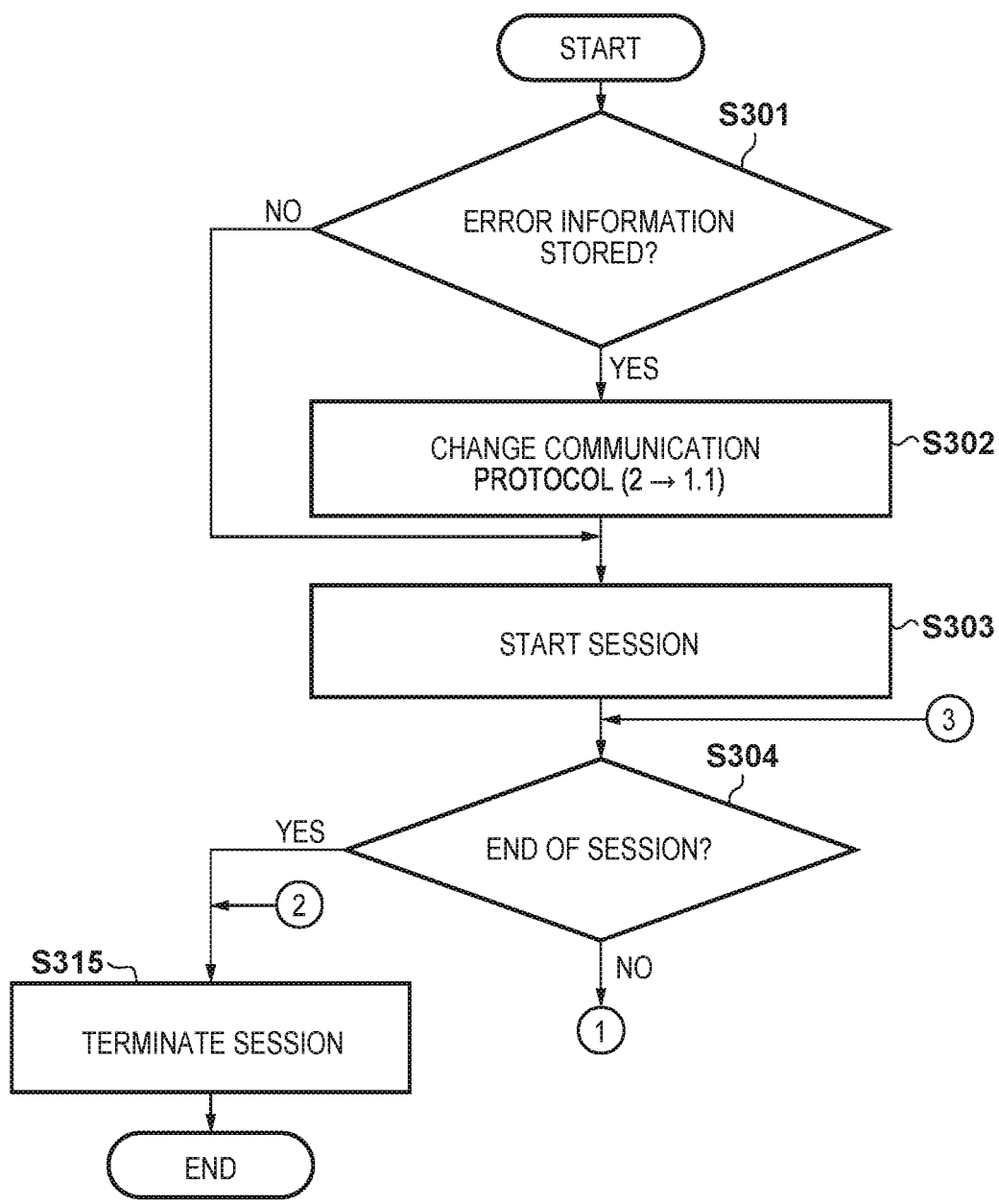
FIG. 3A is a flowchart for explaining processing of the browser.
Figure 3B:
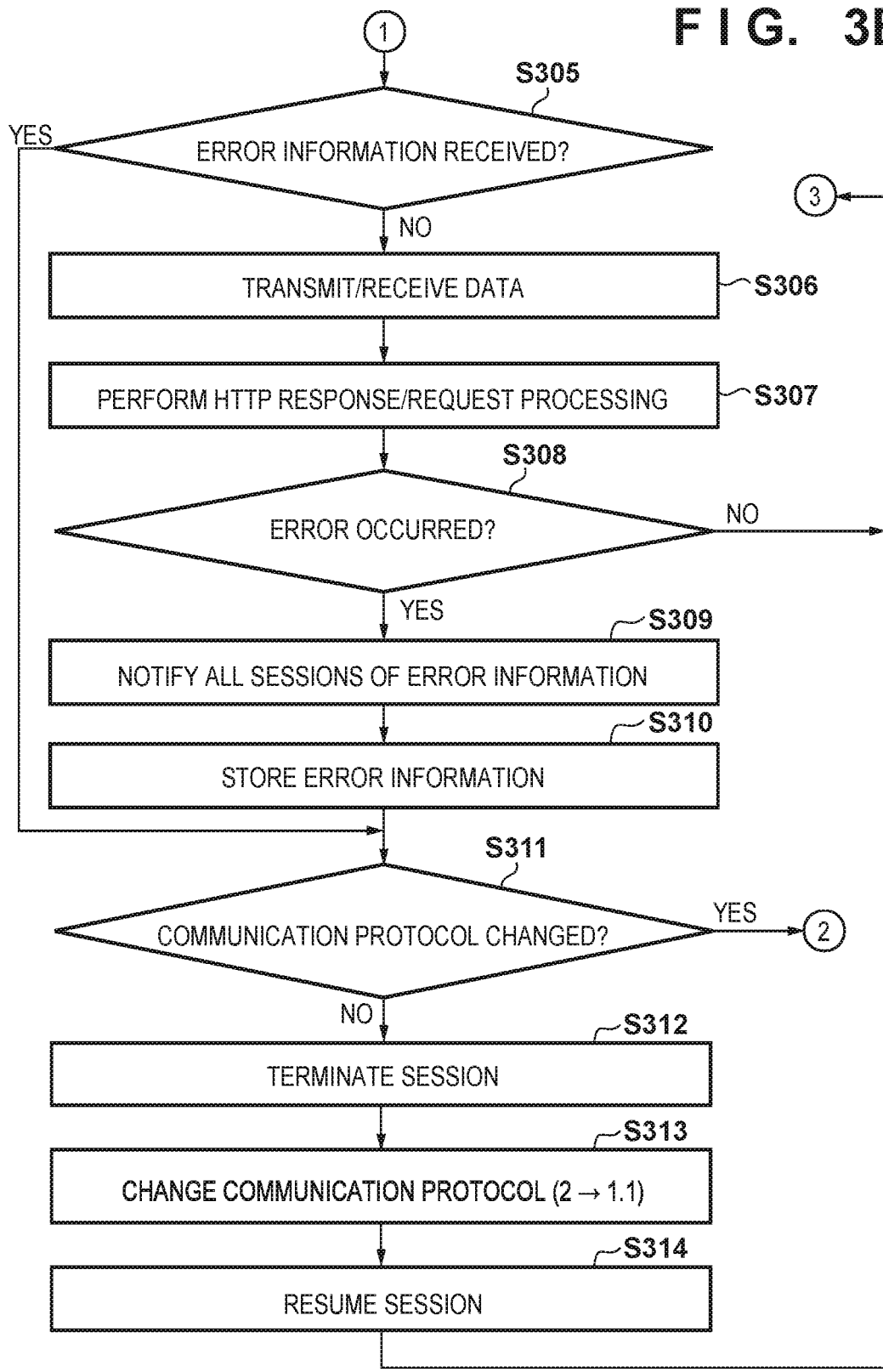
FIG. 3B is a flowchart for explaining the processing of the browser.

The process shown in FIGS. 3A and 3B is performed on all the tab windows open on the client apparatus. This makes it possible to share the error information asynchronously among the plurality of sessions and control the data communication unit 210 in accordance with the error information.

•Sharing of Only Error Information in the Same Domain

An example of sharing the error information has been described above. However, only error information in the same domain may be shared. Domain information of a connection destination when an error occurs can be added to error information stored in the error saving unit 214. A process when only error information in the same domain is shared will be described with reference to flowcharts shown in FIGS. 4A and 4B. Note that in FIGS. 4A and 4B, the same reference numerals denote the same process as the process in FIGS. 3A and 3B, and a detailed description may be omitted.

The first difference from the process shown in FIGS. 3A and 3B is as follows. If the error saving unit 214 stores the error information, the browser 200 determines whether a domain to be connected from now matches the domain information added to the error information (whether it is the same domain) (step S321). Then, the browser 200 performs protocol control of changing the communication protocol of the data communication unit 210 from HTTP/2 to HTTP/1.1 if it is the same domain (step S302) and does not change the communication protocol if it is a different domain.

The second differences are adding the domain information to the error information of which the error information reception units 212 corresponding to all the sessions are notified (step S323) and storing, in the error saving unit 214, the error information added to the domain information (step S324).

The third difference is as follows. The browser 200 determines in step S305 that the error information reception unit 212 receives an error notification, and then determines whether the domain information added to the error information and a domain of the connection destination match (step S322). Then, the process advances to step S311 (the determination of whether the communication protocol has already been changed) if it is the same domain, and the process advances to step S306 (data reception) if it is the different domain.

Figure 4A:
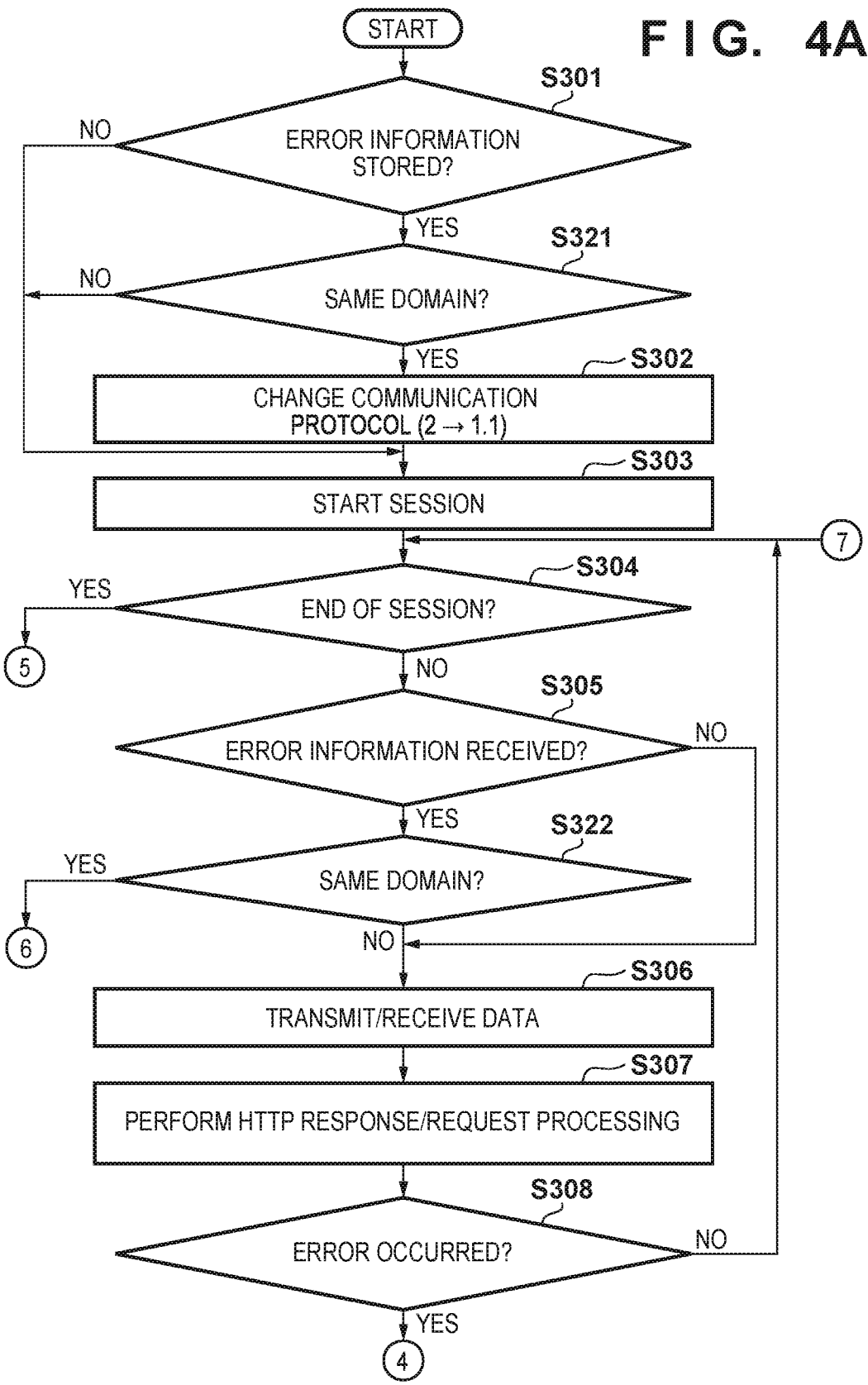
FIG. 4A is a flowchart for explaining processing when only error information in the same domain is shared.
Figure 4B:
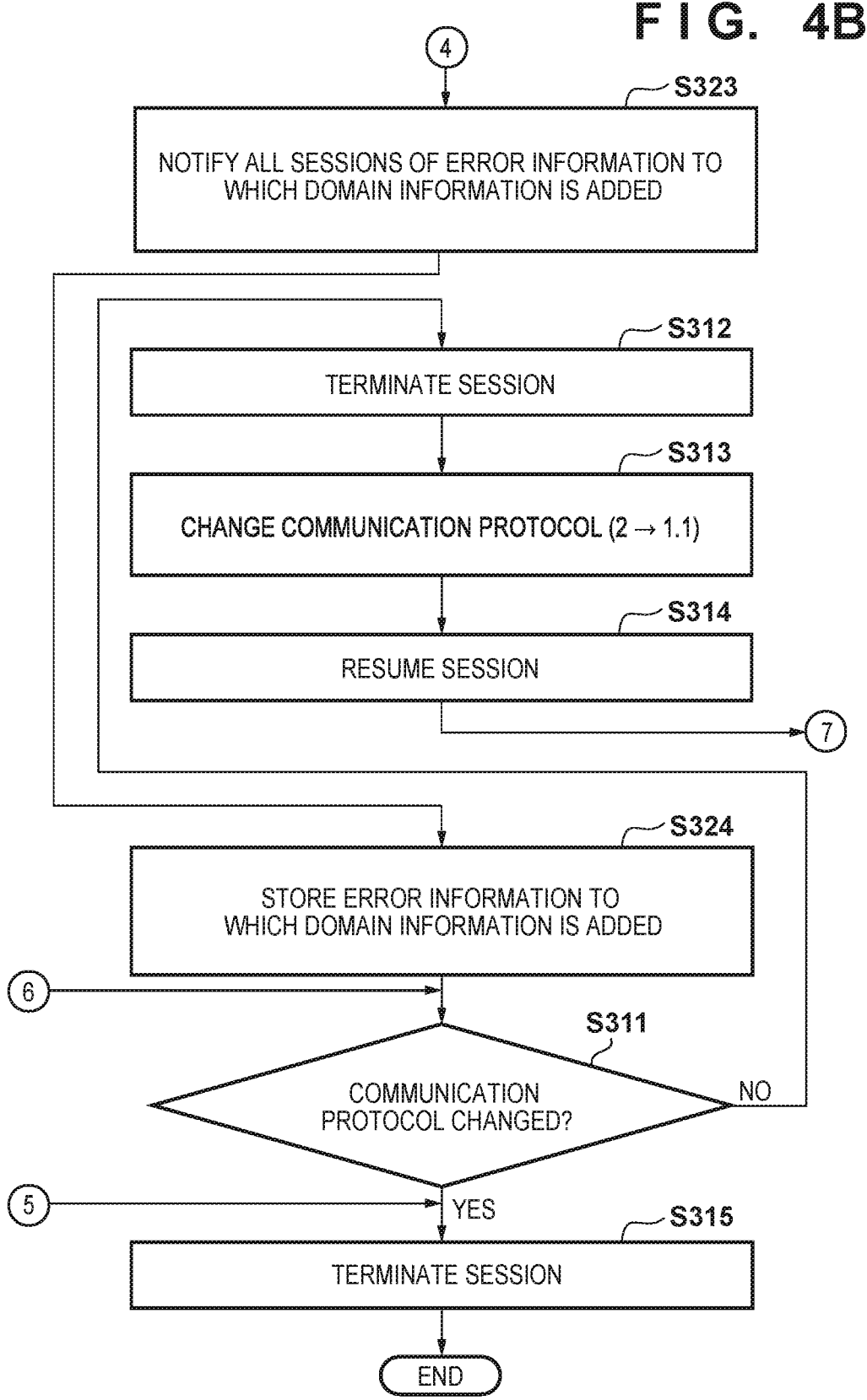
FIG. 4B is a flowchart for explaining the processing when only the error information in the same domain is shared.

If the process shown in FIGS. 4A and 4B is performed in all the tab windows open on the client apparatus, it is possible to share the error information in the same domain asynchronously among the plurality of sessions and control the data communication unit 210 in accordance with the error information.

Second Embodiment

An information processing apparatus and an information processing method according to the second embodiment of the present invention will be described below. Note that in the second embodiment, the same reference numerals as in the first embodiment denote the same arrangement, and a detailed description thereof will be omitted.

An example in which a window size (reception buffer size) that can be designated in HTTP/2 is shared in all sessions will be described as the second embodiment. Dynamic switching to a suitable window size is required in a device having a small memory amount such as an embedded device. In the second embodiment, an example will be described in which when an error in regard to the window size occurs, the session is terminated, a change to the suitable window size is attempted, and the session is resumed. As in the first embodiment, a process of downloading data from a server apparatus will also be described.

Figure 5:
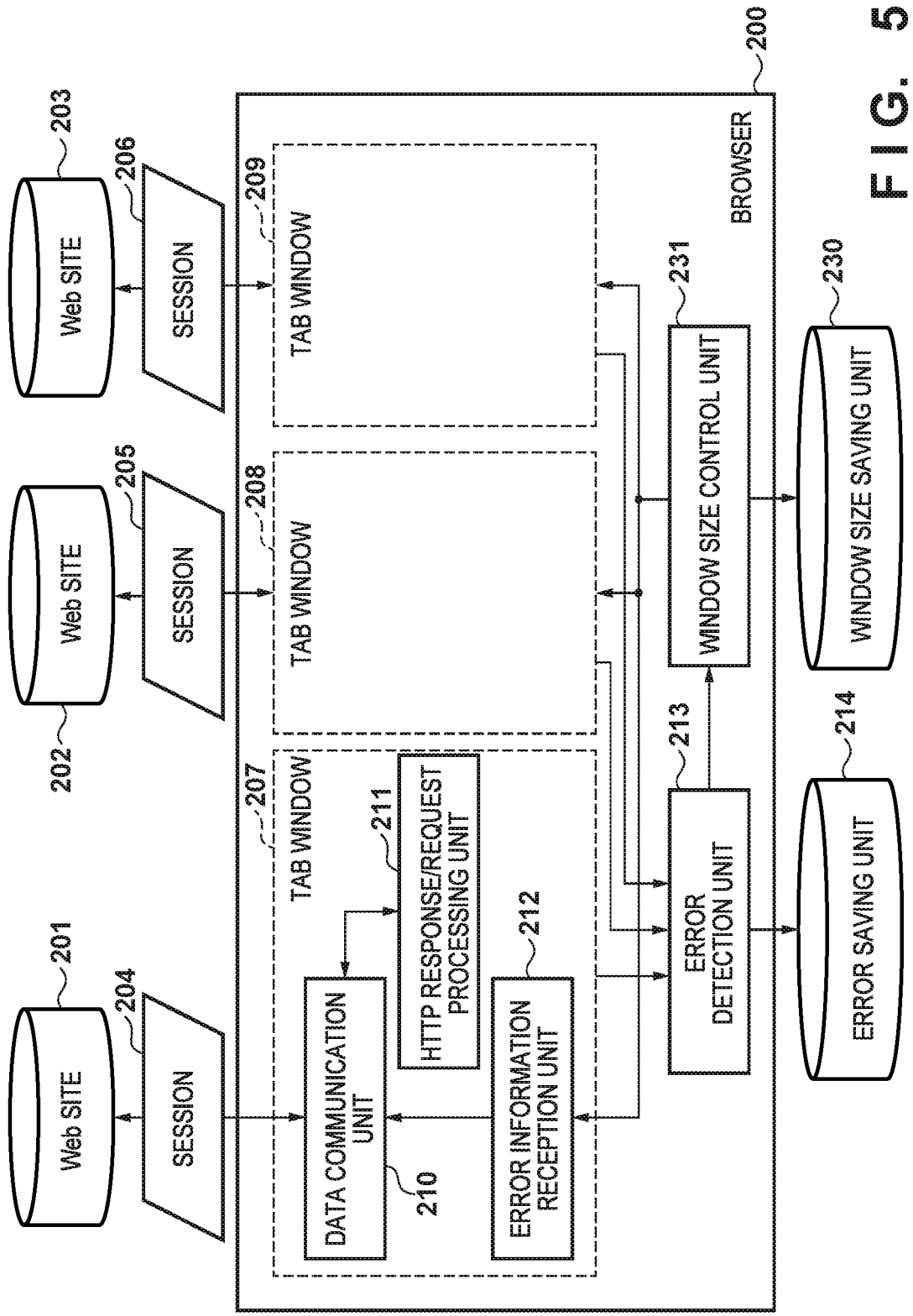
FIG. 5 is a block diagram for explaining the processing arrangement of a browser according to the second embodiment.

The processing arrangement of a browser 200 according to the second embodiment will be described with reference to a block diagram shown in FIG. 5. A difference in FIG. 5 from the processing arrangement shown in FIG. 2 is that an error notification unit 215 is replaced by a window size control unit 231 which notifies about error information including the window size. Further, the window size control unit 231 adds a window size saving unit 230 which stores the window size.

Processing of the browser 200 according to the second embodiment will be described with reference to flowcharts shown in FIGS. 6A and 6B. Note that a description will be made assuming that the browser 200 starts, for example, a process corresponding to a tab window 207. The browser 200 determines whether the window size saving unit 230 stores the window size (step S401). Then, if the window size is stored, the window size is set in a data communication unit 210 (step S402).

Then, the browser 200 starts a session 204 by the data communication unit 210 and transmits request data to the server apparatus of a Web site 201 (step S403). Subsequently, the browser 200 determines whether to terminate the session 204 (step S404), terminates the session 204 by the data communication unit 210 (step S413) if terminating the session 204, and terminates the process corresponding to the tab window 207.

If not terminating the session 204, the browser 200 determines whether an error information reception unit 212 corresponding to the tab window 207 receives error information (step S405). If it is determined that the error information is received, the browser 200 sets the window size included in the received error information in the data communication unit 210 (step S412), returns the process to step S404, and continues the process.

If it is determined that the window size is not received, the browser 200 transmits/receives data to/from the server apparatus of the Web site 201 by the data communication unit 210 (step S406). Then, an HTTP response/request processing unit 211 processes the received data as response data of HTTP and generates request data of HTTP in accordance with a processing result (step S407).

While transmitting/receiving the data and processing the response data, an error detection unit 213 determines whether a window size error occurs (step S408). The window size error occurs when the browser 200 uses memory by an amount larger than a predetermined memory amount. If the window size error occurs, the widow size needs to be reduced in order to reduce a memory use amount. However, a data communication speed is decreased as the window size becomes smaller, making a method of reducing the window size gradually desirable.

If the window size error has not occurred yet, the browser 200 returns the process to step S404 and continues the process. On the other hand, if the window size error has occurred, the window size control unit 231 calculates the suitable widow size (step S409). Then, the browser 200 notifies the error information reception units 212 corresponding to all the sessions of error information including the calculated window size (step S410), stores the calculated window size in the window size saving unit 230 (step S411), and advances the process to step S412.

Figure 6A:
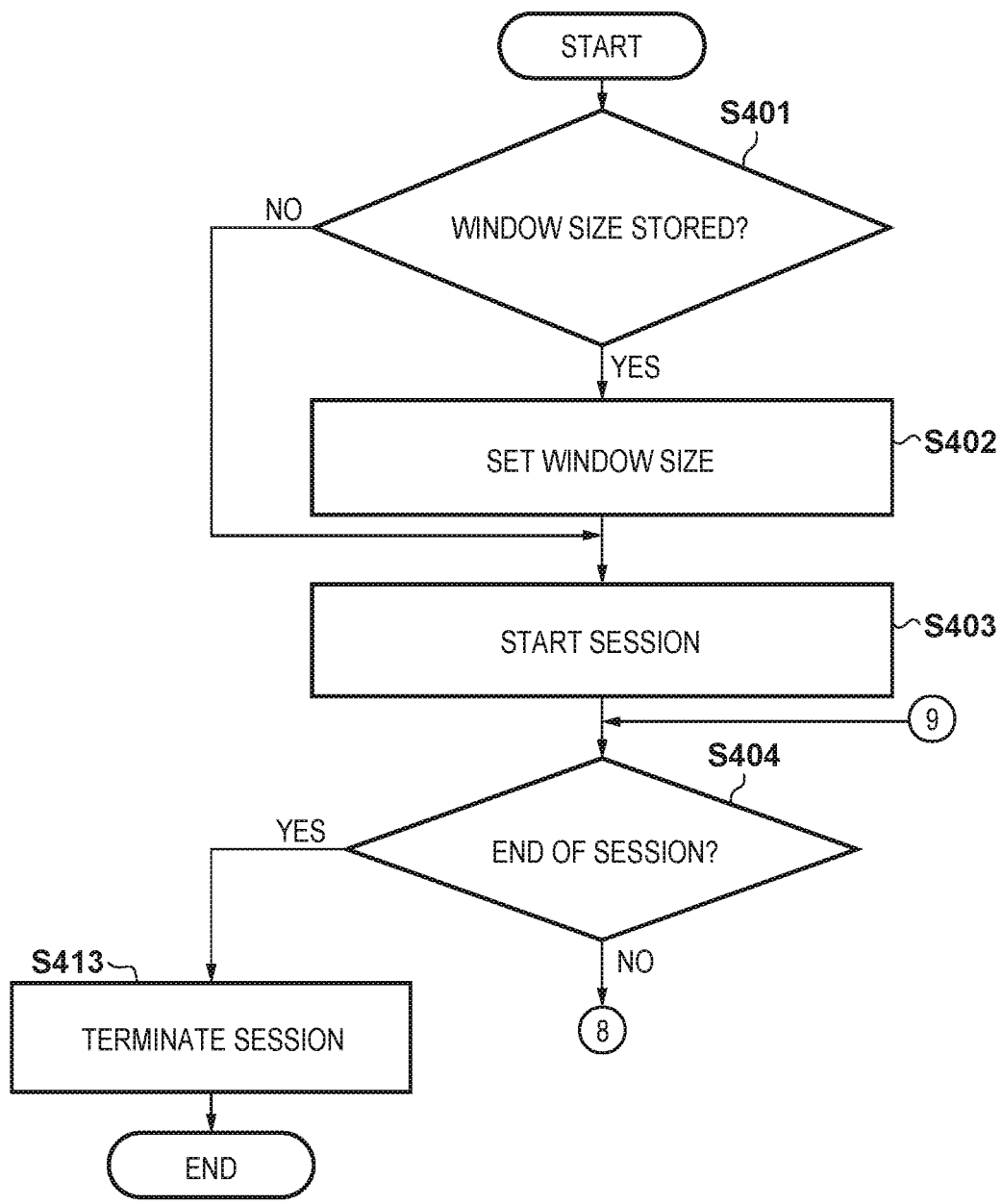
FIG. 6A is a flowchart for explaining processing of the browser according to the second embodiment.
Figure 6B:
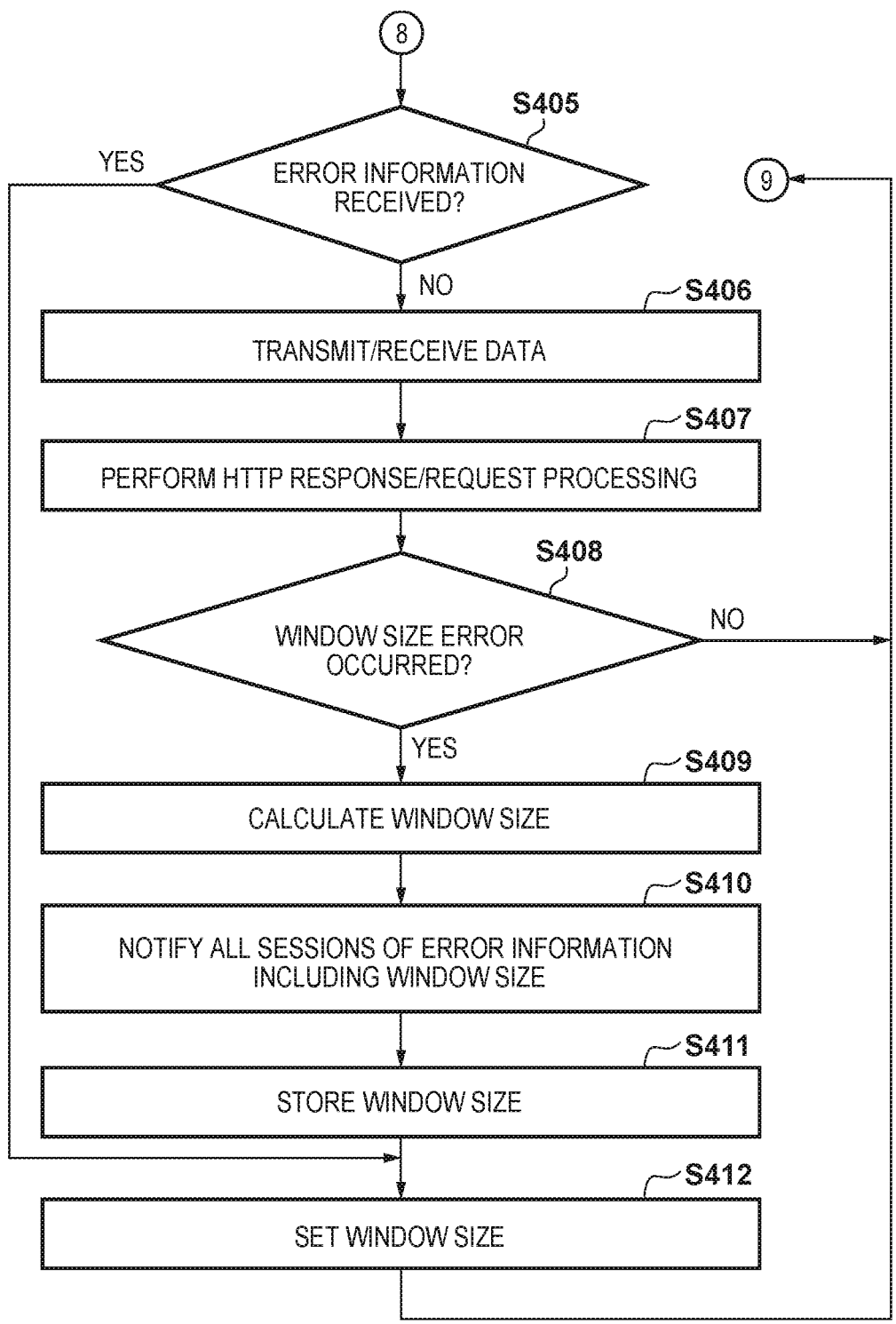
FIG. 6B is a flowchart for explaining the processing of the browser according to the second embodiment.

If the process shown in FIGS. 6A and 6B is performed in all the tab windows open on the client apparatus, it is possible to share a suitable window size and control the data communication unit 210 in accordance with the window size.

Third Embodiment

An information processing apparatus and an information processing method according to the third embodiment of the present invention will be described below. Note that in the third embodiment, the same reference numerals as in the first and second embodiments denote the same arrangement, and a detailed description thereof will be omitted.

An example in which processing of a browser 200 branches off in accordance with the type of errors defined in HTTP/2 will be described in the third embodiment. As in the first embodiment, a process of downloading data from a server apparatus will also be described. Note that the processing arrangement of the browser 200 is the same as in FIG. 2.

A processing relationship when error information and the errors defined by HTTP/2 are received will be described with reference to FIG. 7. Three columns on the left side of FIG. 7 indicate the names, values, and contents of the errors currently defined in HTTP/2. Communication programs operating on a client apparatus or the server apparatus can branch, by the values of the errors, to processes according to the type of errors occurred. An example in which the following four types of processes are performed selectively in accordance with fourteen types of errors shown in FIG. 7 will be described in the third embodiment. The four processes are processes of (1) continuing communication with the server apparatus (to be referred to as "process 1" hereinafter), (2) resuming a session after the session is terminated (to be referred to as "process 2" hereinafter), (3) changing a communication protocol (HTTP/2→HTTP/1.1) and resuming the session after the session is terminated (to be referred to as "process 3" hereinafter), and (4) terminating communication with the server apparatus (to be referred to as "process 4" hereinafter).

Note that this is merely an example, and the type and name of error processing are not limited to those shown here.

The fourth column of FIG. 7 indicates correspondence between the received error information and a process after the error information is received. It is determined as no error when NO_ERROR is received, and process 1 is performed. A cause cannot be specified when PROTOCOL ERROR is received, and thus process 3 is performed. Note that process 4 may be performed when the browser 200 is caused to have an error counter, and a count value obtained by counting the number of times PROTOCOL ERROR is received becomes equal to or larger than a predetermined number.

When INTERNAL_ERROR, STREAM_CLOSED, FRAME_SIZE_ERROR, REFUSED_STREAM, and CANCEL are received, no error may occur if the session is resumed after the session is terminated. Thus, process 2 is performed if these pieces of error information are received.

When FLOW CONTROL ERROR, SETTINGS TIMEOUT, and COMPRESSION ERROR are received, it is considered that the errors occur in flow control processing, SETTINGS frame processing, and header compression of HTTP/2. In this case, similar errors may occur even if reconnection is performed by HTTP/2. When HTTP_1_1 REQUIRED is received, connection not by HTTP/2 but by HTTP/1.1 is required. Thus, process 3 is performed.

When CONNECT_ERROR, ENHANCE_YOUR_CALM, and INADEQUATE_SECURITY are received, the errors may occur even if the sessions are resumed regardless of the communication protocol. Thus, process 4 is performed.

Figure 8A:
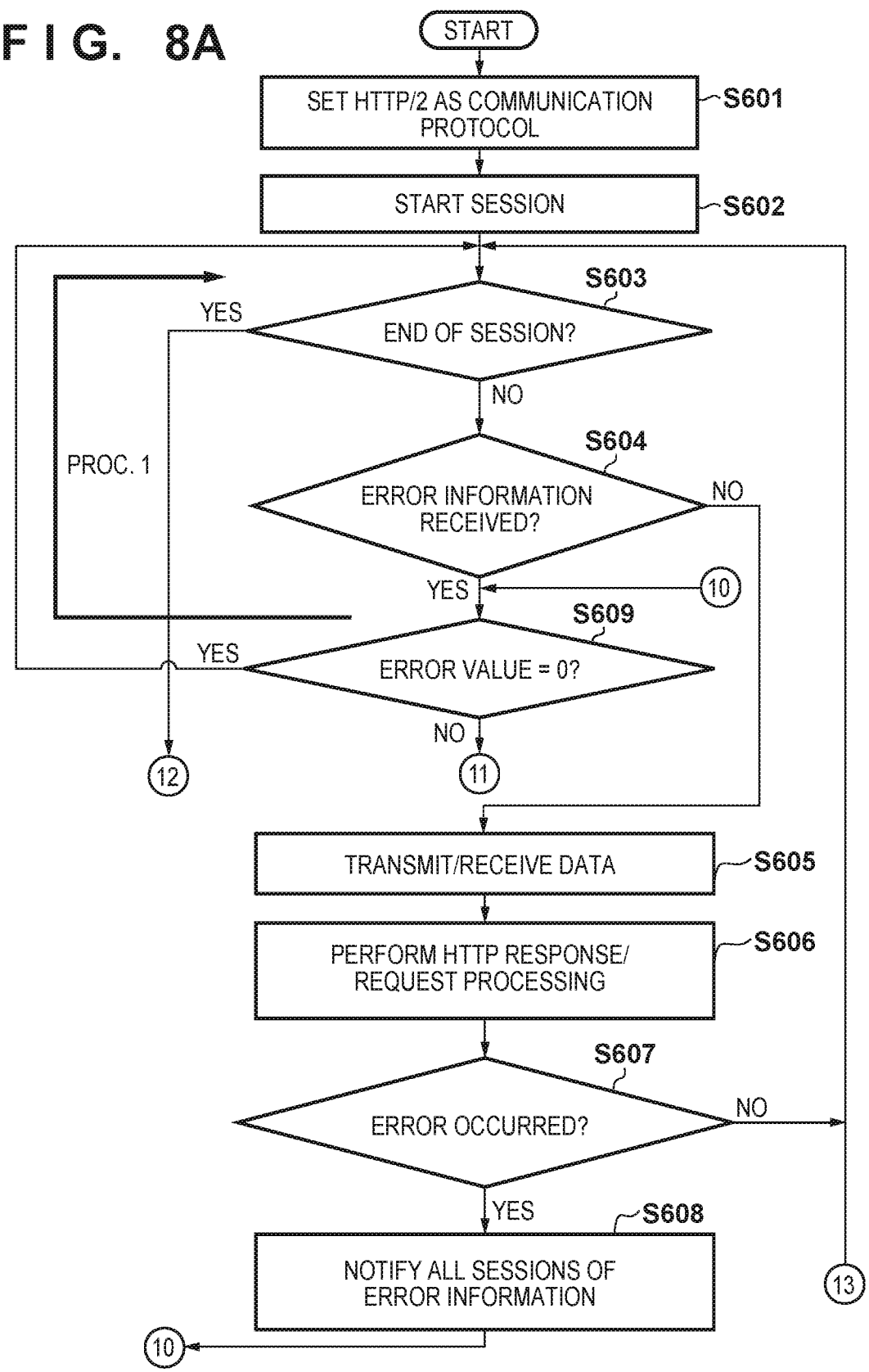
FIG. 8A is a flowchart for explaining processing of a browser according to the third embodiment.
Figure 8B:
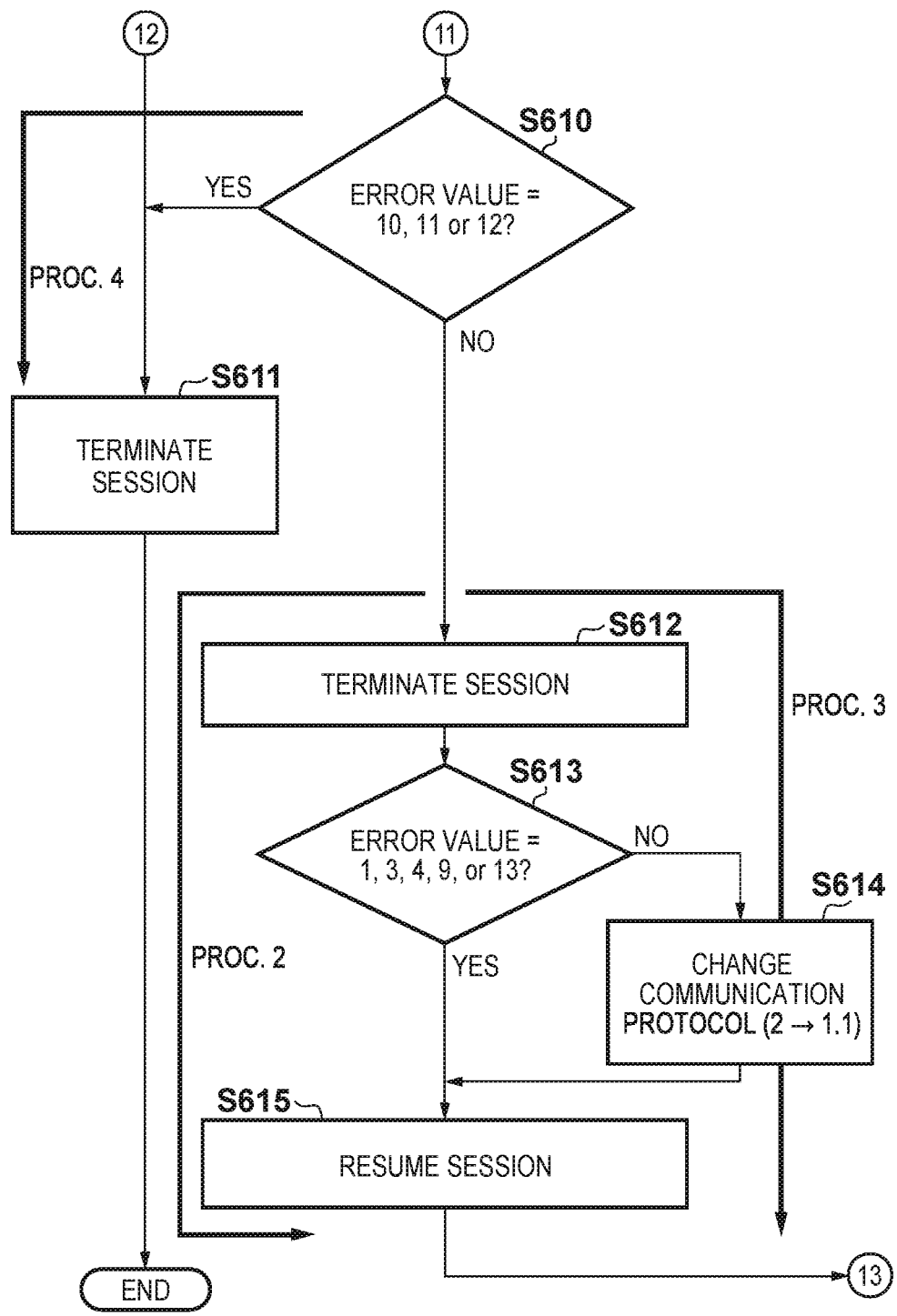
FIG. 8B is a flowchart for explaining the processing of the browser according to the third embodiment.

The processing of the browser 200 according to the third embodiment will be described with reference to flowcharts shown in FIGS. 8A and 8B. Note that a description will be made assuming that the browser 200 starts, for example, a process corresponding to a tab window 207. The browser 200 first sets HTTP/2 as a communication protocol in a data communication unit 210 (step S601), starts a session 402 by the data communication unit 210, and transmits request data to the server apparatus of a Web site 201 (step S602).

Then, the browser 200 determines whether to terminate the session 402 (step S603). If terminating the session, the browser 200 terminates a session 204 by the data communication unit 210 (step S611) and terminates the process corresponding to the tab window 207.

If not terminating the session 204, the browser 200 determines whether an error information reception unit 212 receives error information (step S604). If it is determined that the error information is not received, the browser 200 transmits/receives data to/from the server apparatus of the Web site 201 by the data communication unit 210 (step S605). Then, an HTTP response/request processing unit 211 processes the received data as response data of HTTP and generates request data of HTTP in accordance with a processing result (step S606).

While transmitting/receiving the data and processing the response data, an error detection unit 213 monitors occurrence of an error (step S607). If no error occurs, the browser 200 returns the process to step S603 and continues the process. On the other hand, if the error occurs, an error notification unit 215 notifies the error information reception units 212 corresponding to all the sessions of the error information (step S608), and the process advances to step S609. The error detection unit 213 determines to which error shown in FIG. 7 the detected error corresponds and includes a value corresponding to the determined error in the error information. The error detection unit 213 stores the error information in an error saving unit 214 as in the first embodiment, though it is omitted in FIGS. 8A and 8B.

If the browser 200 determines in step S604 that the error information is received or if the notification of the error information is made in step S608, the browser 200 determines whether a value of the error information (to be referred to as an "error value" hereinafter) is 0 (step S609). If the error value is 0, "process 1" is performed by returning the process to step S603. On the other hand, if the error value is other than 0, the browser 200 determines whether the error value is 10, 11, or 12 (step S610) and terminates the session 204 by the data communication unit 210 (step S611) if the error value is 10, 11, or 12. That is, "process 4" is performed, terminating the process corresponding to the tab window 207.

If the error value is neither 10, 11, nor 12, the browser 200 terminates the session 204 by the data communication unit 210 (step S612) and determines whether the error value is 1, 3, 4, 9, or 13 (step S613). If the error value is neither 1, 3, 4, 9, nor 13, the browser 200 performs protocol control of changing the communication protocol of the data communication unit 210 from HTTP/2 to HTTP/1.1 (step S614) and resumes the session by the data communication unit 210 (step S615). That is, "process 3" is performed. If the error value is any of 1, 3, 4, 9, and 13, the browser 200 resumes the session by the data communication unit 210 (step S615) without changing the communication protocol. That is, "process 2" is performed. Then, the browser 200 returns the process to step S603.

The example in which the communication protocol is changed regardless of the type of errors occurred in the sessions has been described in the first embodiment. In the third embodiment, however, the communication protocol can be changed selectively in accordance with the type of error. As a result, an opportunity to use HTTP/2 for communication with the server apparatus can be increased.

According to an exemplary embodiment, it is possible to provide a mechanism for sharing error information among a plurality of sessions.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more hardware processors; and
one or more memories which store instructions executable by the one or more hardware processors to cause the information processing apparatus to perform at least:
communicating with one or more servers using a first communication protocol via a plurality of sessions including a first session and a second session that are concurrently used by the information processing apparatus;
detecting an error in communication of the first communication protocol in the first session; and
changing, based on the detecting of the error in the first session, both a communication protocol used for communication in the first session and a communication protocol used for communication in the second session from the first communication protocol to a second communication protocol, even if an error in communication of the first communication protocol in the second session has not been detected.

2. The information processing apparatus according to claim 1, wherein in a case where the error in the first session is detected, the second communication protocol is used for communication in a third session that is established after the detection of the error, and
in a case where no error is detected in the plurality of sessions, the first communication protocol is used for communication in a session that is newly established.

3. The information processing apparatus according to claim 1, wherein content data is obtained from the one or more servers by communication in the plurality of sessions, and
in a case where the error in the first session for obtaining content data from a server corresponding to a first domain is detected, the communication protocol used for communication in the second session for obtaining content data from the server corresponding to the first domain is changed from the first communication protocol to the second communication protocol, and a communication protocol used for communication in a third session, among the plurality of sessions, for obtaining content data from a server corresponding to a second domain is not changed.

4. The information processing apparatus according to claim 1, wherein the instructions further cause the information processing apparatus to perform changing a window size used for communication in the second session in a case where an error in regard to a window size is detected in the first session.

5. The information processing apparatus according to claim 1, wherein the session is managed by a session ID issued from a server in accordance with access from a Web browser to the one or more servers.

6. An information processing apparatus comprising:
one or more hardware processors; and
one or more memories which store instructions executable by the one or more hardware processors to cause the information processing apparatus to perform at least:
communicating, using a first communication protocol, for a plurality of tabs including a first tab and a second tab that are concurrently displayed in a Web browser;
detecting an error in communication of the first communication protocol associated with the first tab; and
changing, based on the detecting of the error in the first tab, both a communication protocol used for communication associated with the first tab and a communication protocol used for communication associated with the second tab from the first communication protocol to a second communication protocol, even if an error in communication of the first communication protocol associated with the second tab has not been detected.

7. The information processing apparatus according to claim 1, wherein the first communication protocol is HTTP/2, and the second communication protocol is HTTP/1.1.

8. An information processing method for an information processing apparatus, comprising:
communicating with one or more servers using a first communication protocol via a plurality of sessions including a first session and a second session that are concurrently used by the information processing apparatus;
detecting an error in communication of the first communication protocol in the first session; and
changing, based on the detecting of the error in the first session, both a communication protocol used for communication in the first session and a communication protocol used for communication in the second session from the first communication protocol to a second communication protocol, even if an error in communication of the first communication protocol in the second session has not been detected.

9. The information processing method according to claim 8, wherein in a case where the error in the first session is detected, the second communication protocol is used for communication in a third session that is established after the detection of the error, and
in a case where no error is detected in the plurality of sessions, the first communication protocol is used for communication in a session that is newly established.

10. The information processing method according to claim 8, wherein content data is obtained from the one or more servers by communication in the plurality of sessions, and
in a case where the error in the first session for obtaining content data from a server corresponding to a first domain is detected, the communication protocol used for communication in the second session for obtaining content data from the server corresponding to the first domain is changed from the first communication protocol to the second communication protocol, and a communication protocol used for communication in a third session, among the plurality of sessions, for obtaining content data from a server corresponding to a second domain is not changed.

11. An information processing method comprising:
communicating, using a first communication protocol, for a plurality of tabs including a first tab and a second tab that are concurrently displayed in a Web browser;
detecting an error in communication of the first communication protocol associated with the first tab; and changing, based on the detecting of the error in the first tab, both a communication protocol used for communication associated with the first tab and a communication protocol used for communication associated with the second tab from the first communication protocol to a second communication protocol, even if an error in communication of the first communication protocol associated with the second tab has not been detected.

12. The information processing method according to claim 8, wherein the first communication protocol is HTTP/2, and the second communication protocol is HTTP/1.1.

13. A non-transitory computer-readable storage medium storing a computer program for causing an information processing apparatus to execute a method, the method comprising:

communicating with one or more servers using a first communication protocol via a plurality of sessions including a first session and a second session that are concurrently used by the information processing apparatus;

detecting an error in communication of the first communication protocol in the first session; and changing, based on the detecting of the error in the first session, both a communication protocol used for communication in the first session and a communication protocol used for communication in the second session from the first communication protocol to a second communication protocol, even if an error in communication of the first communication protocol in the second session has not been detected.

14. The information processing apparatus according to claim 6, wherein the first communication protocol is HTTP/2, and the second communication protocol is HTTP/1.1.

15. The information processing method according to claim 11, wherein the first communication protocol is HTTP/2, and the second communication protocol is HTTP/1.1.

* * * * *